(12) United States Patent
Prabandham et al.

(10) Patent No.: US 6,701,438 B1
(45) Date of Patent: Mar. 2, 2004

(54) METHODS AND APPARATUS FOR PROVIDING CUSTOMIZABLE SECURITY AND LOGGING PROTOCOLS IN A SERVLET ENGINE

(75) Inventors: Harish Prabandham, Sunnyvale, CA (US); Vivek Nagar, Sunnyvale, CA (US); James Duncan Davidson, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/333,877

(22) Filed: Jun. 14, 1999

(51) Int. Cl.[7] .............................. H04L 9/00; H04L 9/32; H04K 1/10; H04K 1/00; G06F 7/00; G06F 11/30; G06F 12/14; G06F 15/16

(52) U.S. Cl. ..................... 713/201; 713/200; 713/155; 713/168; 713/182; 709/203; 709/219; 709/229; 707/10

(58) Field of Search ................................. 713/201, 155, 713/168, 169, 182, 200

(56) References Cited

U.S. PATENT DOCUMENTS 5,944,781 A    8/1999 Murray ........................ 709/202
6,151,599 A  * 11/2000 Shrader et al. .............. 713/201
6,226,752 B1 *  5/2001 Gupta et al. ................. 713/201

FOREIGN PATENT DOCUMENTS

WO    99/05813    2/1999
WO    00/11832    3/2000

OTHER PUBLICATIONS

C. Dalton et al., "Applying military grade security to the Internet", Computer Networks and ISDN Systems, North Holland Publishing, Amsterdam, NL, vol. 29, No. 15, Nov. 1, 1997.

J. Lowe, "How Java Servlets can replace CSI Scripts—For Ease, Performance & More. We look at three Approaches to Plug–In Server–Side Java Execution", NetscapeWorld, pp. 1–3, May 5, 1997.

* cited by examiner

Primary Examiner—Thomas R. Peeso
Assistant Examiner—A. Nobahar
(74) Attorney, Agent, or Firm—Beyer Weaver & Thomas, LLP

(57) ABSTRACT

Methods and apparatus for providing customized security and logging protocols in a servlet environment are described. A servlet engine that includes a security module that assures that only those requests that are properly authenticated and authorized are serviced by a servlet. A logging module provides customized records of both security module and servlet transactions.

20 Claims, 6 Drawing Sheets

METHODS AND APPARATUS FOR PROVIDING CUSTOMIZABLE SECURITY AND LOGGING PROTOCOLS IN A SERVLET ENGINE

BACKGROUND OF THE INVENTION

1. Field of Invention

The invention relates generally to computer systems. More particularly, methods and apparatus for providing customizable security and logging modules in a server environment.

2. Description of Relevant Art

The explosive growth in Internet commerce, also referred to as e-commerce, has made it critical to look for ways of increasing the capability of both handling a large number of secure transactions over the Internet as well as providing the capability of efficiently logging those transactions.

Currently, most web browsers have a very simple approach to networking as illustrated in FIG. 1. Given a web browser 100 and a URL (universal resource locator) containing a host name and a document on that host (also referred to as an http request), a browser 102 breaks up (parses) the URL into a named host portion (not shown) and a requested document 106. In one embodiment of the invention, the requested document 106 takes the form of HTML (Hyper Text Markup Language) statements well known to those skilled in the art. In the case where the requested document is not stored in a local cache memory, the browser 102 makes a TCP ("transmission control protocol") connection to the named host 104 which includes a server 108. Specific to the Web, a Web server is a computer program (typically residing in the host computer 104) that serves requested HTML pages or files whereas a Web client is the requesting program (such as the browser 100) associated with the user.

In some cases, the requested document 106 takes the form of static web pages 110 stored in the host computer 104. In another case, however, the requested document 106 is what is referred to as a dynamic web page 112. Typically the dynamic web page 112 is stored in, for example, a database which is typically an external database 114 which the server 108 accesses by way of a common gateway interface (CGI) application.

The common gateway interface (CGI) is a standard way for a Web server to pass a Web user's request to an application program and to receive data back to forward to the user. When the user requests a Web page (for example, by clicking on a highlighted word or entering a Web site address), the server 108 sends back the requested page in the form of an http response. However, when a user fills out a form on a Web page and sends it in, it usually needs to be processed by an application program. The Web server 108 typically passes the form information to a small application program that processes the data and based upon the information provided, sends back a response.

Unfortunately, the common gateway interface is inefficient and resource intensive. By way of example, most modem Web applications need some kind of database access. Using a CGI application means a new database connection is created every single time the CGI runs, taking up to several seconds each time. Therefore, the CGI is unsuitable for handling the large number of transactions (referred to as "hits" which can, and usually do number in the thousands, or hundreds of thousands, and more in some cases) that are required for economic use of the Internet. One solution to the bottleneck created by the CGI is referred to as a servlet, or Java servlet when incorporated in a Java based web server.

A Java servlet is a Java program that executes on the Web or HTTP server in response to requests (i.e., http requests) from a Web browser. The Web server software uses Java Virtual Machine to run the servlet and generate an HTML page. The servlet takes input from the HTML page (http request) containing HTML input tags, processes it, and returns a responsive HTML page (http response) with the results. Since the Java servlet is dedicated to a single browser, the Java servlet is capable of handling much more traffic (in the form of http requests and associated http responses) than is possible with conventional CGI applications.

In spite of these advantages, Java servlets can not provide customized security and logging protocols. Currently, security and logging protocols are now only provided by the web server which are the same for all web applications supported thereto. In this way, all applications (or HTTP servers) coupled to a particular web server can only use whatever security and logging protocols are afforded that particular web server regardless of the specific needs of a particular application. This inflexibility adds substantial cost to effectuating an e-commerce web site since a user/developer must find a web server that the specific security and logging requirements of the desired web site in addition to the assurance that the server so selected can also handle the number of anticipated (hopefully) transactions (hits) or develop the security and logging code as a part of the application.

Therefore, what is desired is a method and an apparatus for providing customized security and logging protocols in a servlet environment.

SUMMARY OF THE INVENTION

In one embodiment of the present invention, a servlet engine arranged to provide selected security and logging protocols is disclosed. The servlet engine includes a servlet container having a security module, a logging module, and a servlet. In one embodiment, the security module provides the selected security protocols that include authentication and authorization protocols. The authentication protocols assure that a request received by the servlet engine has a verified source and the authorization protocols assure that the verified source has appropriate permission.

The logging module provides the selected logging protocols such that those received requests that do not have originate from the verified source or do not have appropriate permission are recorded by the logging module.

In a preferred embodiment, the servlet handles those requests that are authenticated and authorized by the security module and the servlet notifies the logging module of those requests which have been successfully handled by the servlet with a first type flag. The servlet notifies the logging module of those requests which have not been successfully handled by the servlet with a second type flag.

In another aspect of the invention, a method for accessing a protected resource coupled to a servlet engine that utilizes programmer selected security and logging protocols is described. In one embodiment, only those requests that pass all security protocols are handled by a servlet included in the servlet engine. In a preferred embodiment, the security protocols include authentication and authorization protocols defined by the programmer. In this way, only a requestor having appropriate security clearances can access the protected resource, such as a data base.

In yet another aspect of the invention, an apparatus for providing access to a protected resource is disclosed. An authentication means for first determining that the source of a protected resource access request is verified is coupled to an authorization means for second determining that the source of the protected access request has appropriate protected resource access permission. A request handling means coupled to the authorization means services those requests passed by both the authentication means and the authorization means, and a logging means coupled to the authentication means and the authorization means records failed authentication or failed authentication transactions as well as serviced transactions.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

In the following description, frameworks and methods of providing customized security and logging protocols in a web server, such as for example, a browser/server environment are described. Although, the invention will initially be described in terms of a sever application residing in a multithread, object oriented computing system, it should be noted that the present invention can be used in any system that is capable of handling http requests and responses.

In general, when a browser, also referred to as an HTTP page, that is coupled to a web server generates an http request, a programmer/developer provided security module included in the web server authenticates (i.e., confirms the identity in one embodiment) of the browser providing the http request. If the authentication is successful, i.e., the browser is properly identified, then the security module determines if the browser has proper authorization to access the requested data base. In those cases where the browser has been both properly identified and also has the proper authorization, the associated servlet is called upon to service the validated http request, by, if necessary, accessing a protected resource, such as a secure data base.

Once the associated servlet has handled the http request, an associated logging module records the status of the http request handling. In one embodiment, only those http requests not associated with an error flag (i.e., the handling was "successful") are logged as successful. In another embodiment, all failed authorizations and/or authentications are logged by the logging module as well. In this way, attempts to "hack", or otherwise break into a secure data base or web server can be tracked and the perpetrator(s) identified using well known identification and tracing techniques.

In one embodiment, during what is referred to as a session, authorization is based in part upon a cookie (that resides in the browser) previously provided by the security module. As can be appreciated by those in the art, a session is a mechanism that servlets use to maintain state about a series of requests from the same user (i.e., the same browser) across some period of time. A cookie is a mechanism that a servlet uses to have clients hold a small amount of state-information associated with the user. Servlets can use the information in a cookie as the user enters the site (as a low security user sign-on, for example), as the user navigates around a site (as a repository of user preferences, for example), or both.

Figure 1:
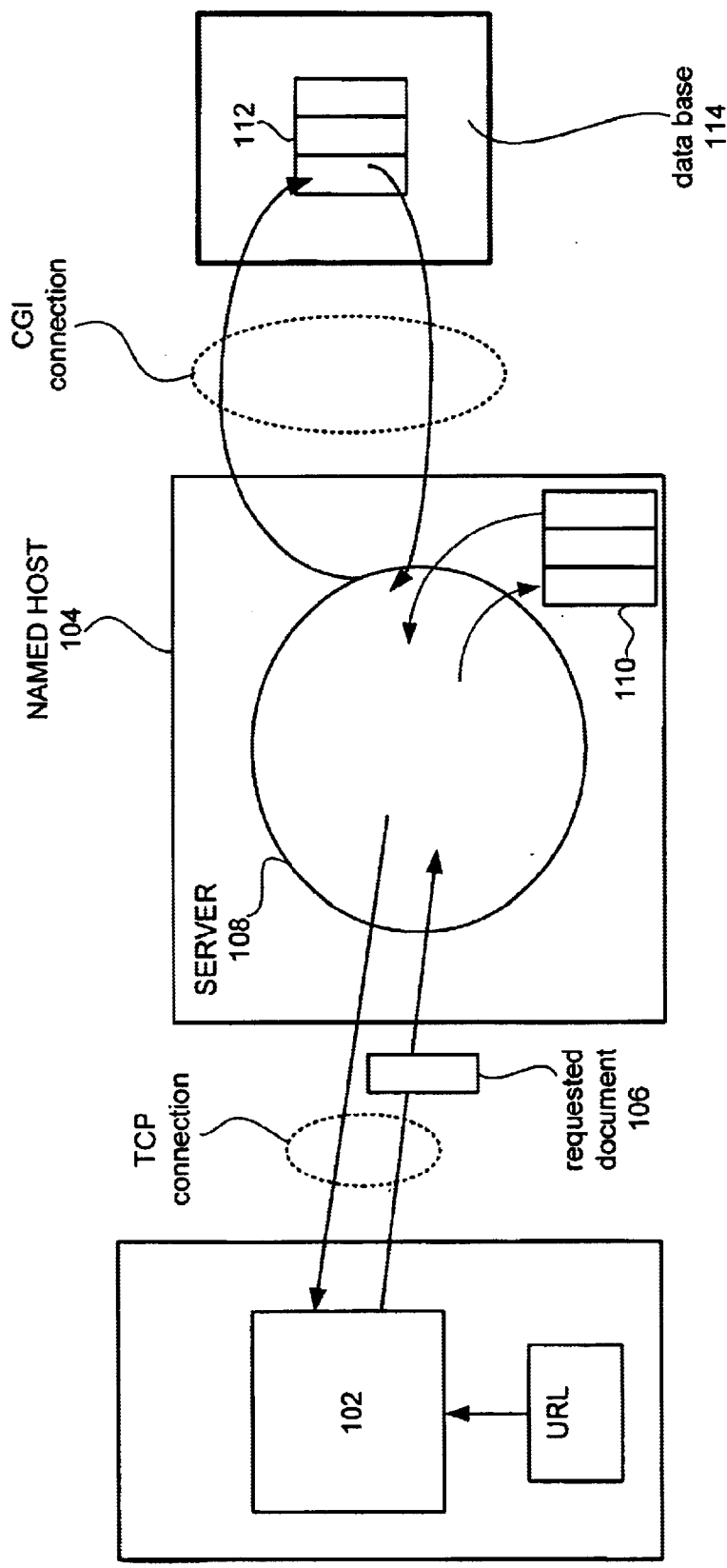
FIG. 1 shows a conventional browser/server configuration.
Figure 2:
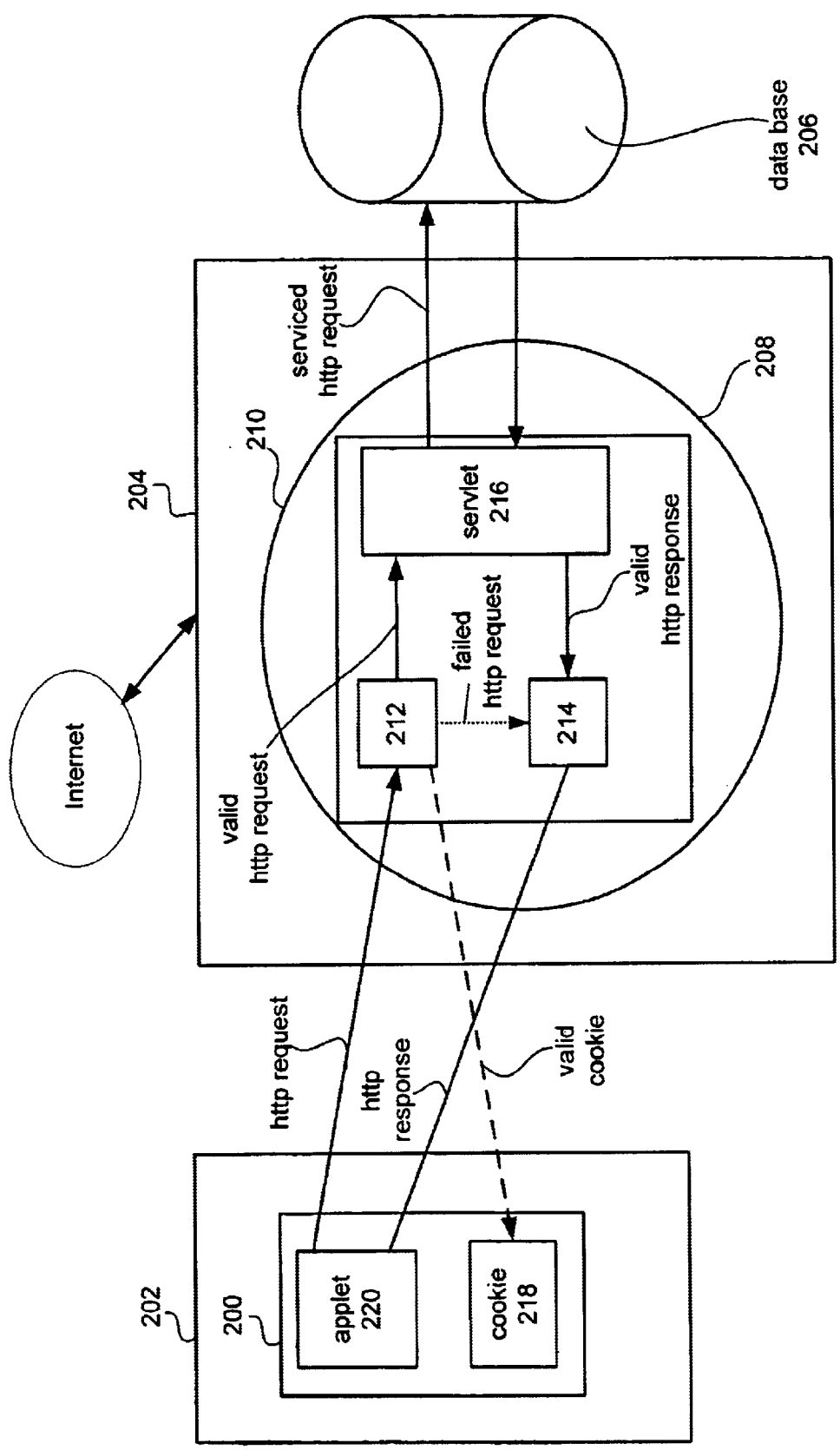
FIG. 2 shows a Java based server and associated servlet container that provides user configurable security and logging protocols in accordance with an embodiment of the invention.

Most web servers have a very simple approach to networking as illustrated in FIG. 2. A browser 200 (also referred to as a client application or program) is a program resident on a local computer 202 that generates what is referred to as an http request containing a named host computer 204 and a document coupled to the host computer 204, that is typically stored in an external data base 206. The host computer 204 is typically coupled to a group of computers in a network such as a local area network (LAN) or a wide array network (WAN), or more typically as part of the Internet network of computers. In the described embodiment, the host computer 204 includes a web server application program (server) 208.

In the described embodiment, the server 208, in turn, includes a servlet container 210 that includes a security module 212 coupled to a logging module 214 which is coupled, in turn, to a servlet 216. In one implementation, the servlet container 210 is also referred to as a servlet engine and provides an interface between the server 208 and the servlet 216. In those cases where the security module 212 is active (i.e., provides developer/programmer security protocols), the servlet 216 services, or handles, only those http requests that have been both authenticated and authorized by the security module 212. In those cases where the security module 212 is not active or the server programmer has decided that specific security protocols are not needed, then in one implementation of the invention, the security protocols already provided by the web server 204 are used in a default mode.

In the case where the http request fails to be either authenticated or authorized, an error flag is posted to the logging module 214. Such error flags can include error codes such as what is referred to as a "401" error code indicating the authentication has failed. In another failure mode, a "404" error code indicating that a particular object is not found is generated. It is one of the advantages of the present invention to provide the servlet engine developer/programmer this ability to customize both the type and number of error codes for which the logging module 214 records. In this way, the servlet programmer/developer can provide the capability of, for example, tracking hackers (both potential and actual) by logging multiple failed accesses by a particular browser within a specific period of time or determine the frequency and type of various security failures promulgated by the user of a particular browser.

When the http request has otherwise been validated by the security module 212, the validated http request is forwarded to the servlet 216. In the described embodiment, the servlet 216 handles the http request by, for example, generating a document object module (DOM) corresponding to the requested document stored in the data base 206 associated with the valid http request. Once the requested document has been retrieved from the data base 206, it is forwarded to the servlet 216. The servlet 216 then notifies the logging module 214 substantially simultaneously with passing the retrieved document to the browser 200 in the form of an http response.

The logging module typically tracks information related to, in one embodiment, IP (Internet Protocol) address information indicative of the virtual location of the browser 200, as well as the number of successful hits versus the number of unauthorized and/or unauthenticated requests posted to it by the security module 212. With this information, a developer is able to track the number and type of http requests which the servlet processes. In this way, a web site owner is able to better track the web site usage as well as be able to determine the number of users which have attempted to enter a particular site and those that have failed and/or succeeded in entering the site in question.

In the case where a user decides to initiate a session, then in one embodiment, during the initiation of the session, the security module 212 provides a cookie 218 to the browser 200 that is active for the duration of the session. An example of one such session is when a user instantiates an applet 220, for example, in the browser 200 in order to access a secure web site or the data base 206. In one case, the user may desire to transact secure business by accessing sensitive information stored in the data base 206 in order to, for example, to use a bank's on line banking web site or to order the latest in men's wear. The cookie 218 provides the browser 200 with the necessary authorization and authentication as required during the period of time defined for the session. In that period of time, as long as the cookie 218 is valid, all http requests generated by the applet 220 for that secure web site effectively bypass the security module 212 and are handled by the servlet 216. However, if at any time the cookie 218 becomes invalid, by for example, expiring, or that particular session has ended, then the security module 212 must re-issue a new cookie based upon the appropriate security protocols.

Figure 3:
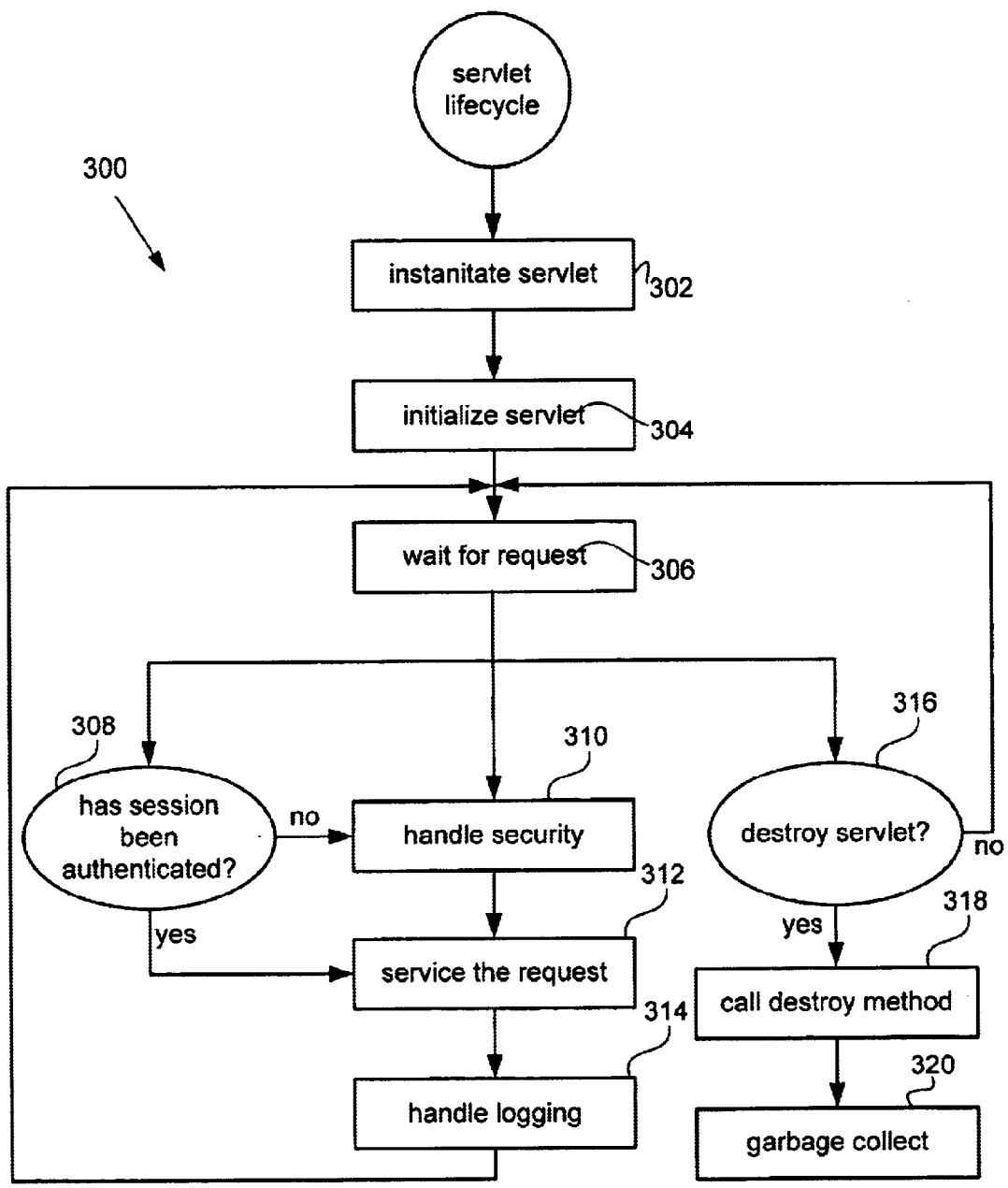
FIG. 3 is a flowchart detailing a servlet lifecycle in accordance with an embodiment of the invention.

FIG. 3 is a flowchart detailing a servlet lifecycle 300 in accordance with an embodiment of the invention. It should be noted that the servlet lifecycle 300 will be described in terms of a Java servlet that is designed to execute in a Java Virtual Machine in an object oriented computing system. In one embodiment of the invention, the servlet lifecycle 300 begins at 302 by instantiating a servlet after which the server initializes the servlet at 304. In order to initialize a servlet, the server loads the servlet and runs the servlet's "init method". It should be noted that servlet initialization completes before client requests are handled and before the servlet is destroyed. Even though most servlets are run in multi-threaded servers, servlets have no concurrency issues during servlet initialization. The server calls the init method once when the server loads the servlet and will not call the init method again unless the server is reloading the servlet. The server can not reload a servlet until after the server has destroyed the servlet by calling the destroy method. After the server has initialized the servlet, the servlet waits for an http request at 306. When an http request has been received and when a client session is part of the http request, then at 308 a determination is made whether or not the client session has been authenticated. Typically, this authentication is performed by determining if a cookie corresponding to the session is unexpired and/or has appropriate sign-on. If it is determined that the session is not authenticated, then the security module handles security at 310 by, for example, by authenticating the session by examining the cookie. In the case where the received http request is the initial http request for a particular session, then that http request is validated (i.e., both authenticated and authorized) by the security module after which, a new cookie is issued to the client browser.

On the other hand, if the session has been authenticated at 308, then the http request is serviced by the servlet at 312 after which the http response is logged by the logging module at 314. It should be noted that at any time the security module determines that an http request has failed for any reason, an appropriate error flag is posted to the logging module.

Returning to 306, when the received http request is not part of a session, then the security module handles security at 310 where failures are posted to the logging module for logging at 314 whereas validated http requests are serviced by the servlet at 312.

It should be noted, that when no additional http requests are forthcoming within a pre-selected period of time at 306, then a determination is made at 316 whether or not the servlet is to be destroyed. If the determination is made that the servlet is not to be destroyed, then control is passed back to 306 until such time as an http request is received. On the other hand, when it is determined that the servlet is to be destroyed then the server destroys the servlet by running the servlet's destroy method at 318. In the described embodiment, the destroy method is run once and the server will not run that servlet again until after the server reloads and reinitializes the servlet. After the destroy method is run once, the destroyed servlet is garbage collected at 320. It should be noted that in a multi-threaded system, a clean shutdown must be provided since there could be long-running threads still running service requests.

Figure 4:
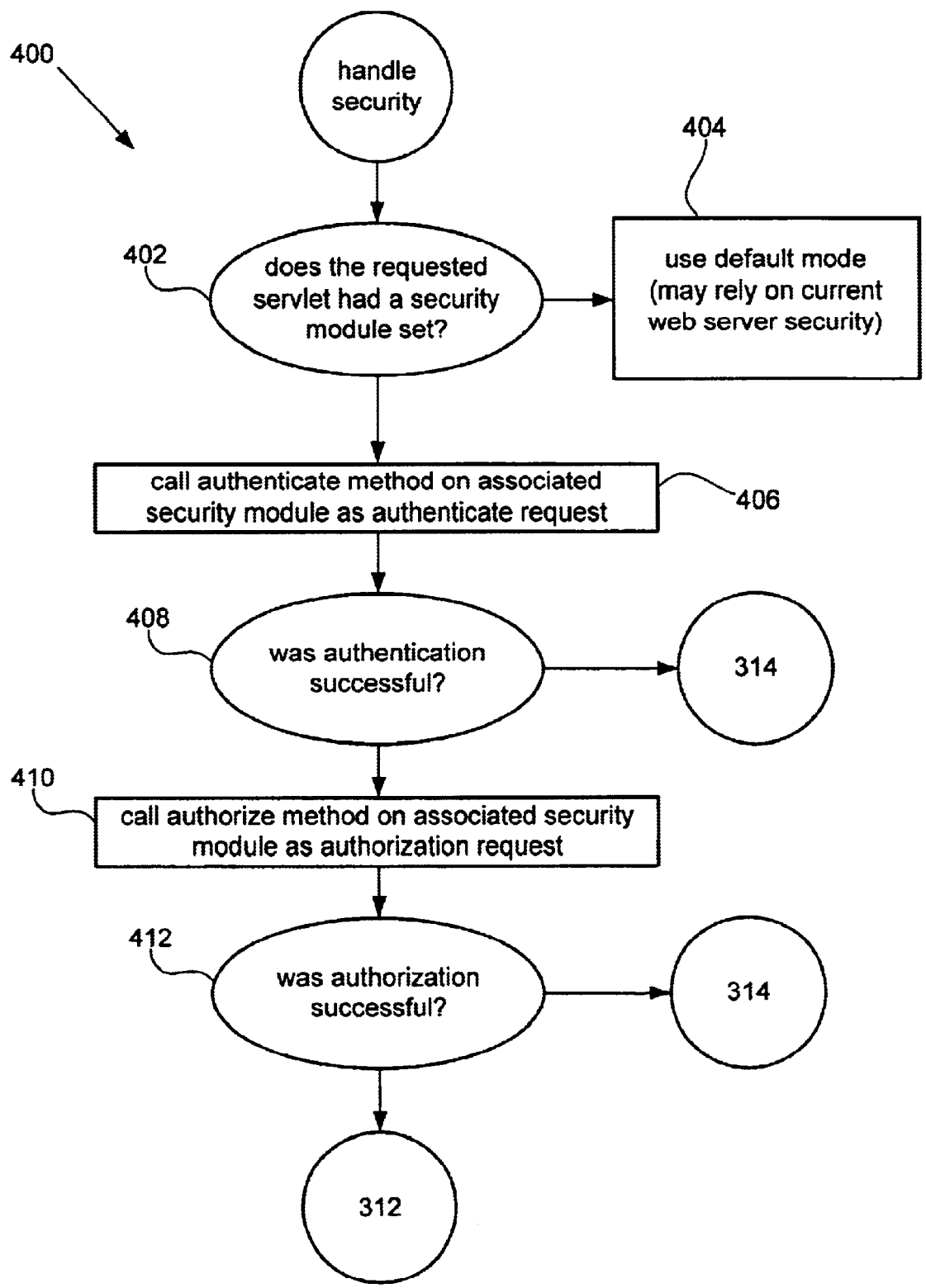
FIG. 4 is a flowchart detailing a process that implements the handle security operation of FIG. 3.

FIG. 4 is a flowchart detailing a process 400 that implements the handle security operation 310 of FIG. 3. It should be noted that the process 400 is but one way of handling security in accordance with the present invention and as such should not be construed as limiting the scope of the invention. The process 400 begins at 402 by determining if the security module is set active. If it is determined that the security module is not set active, then the servlet utilizes the server's default security mode at 404. On the other hand, if the security module is set active, then to authenticate a received http request, an authentication method is called by the associated security module as an authentication request at 406. A determination at 408 is then made whether or not the authentication was successful. If the authentication was unsuccessful, then control is passed to 314 (logging), otherwise, the security module calls an authorize method on the http request at 410. If the authorization is unsuccessful, then control is passed to 314 (logging), otherwise, the http request is serviced by the servlet at 312.

Figure 5:
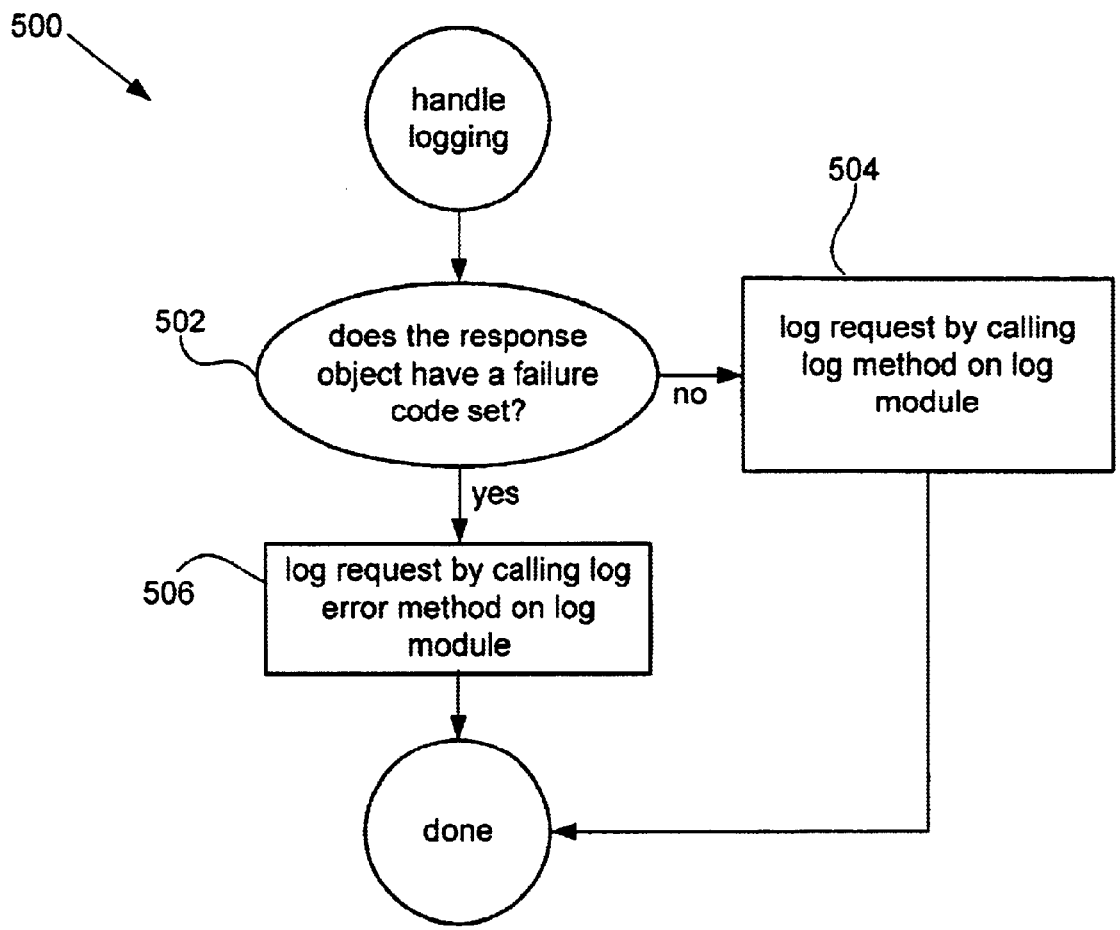
FIG. 5 is a flowchart detailing a process that implements the handle logging operation of FIG. 3.

FIG.5 is a flowchart detailing a process 500 that implements the handle logging operation 314 of FIG. 3. It should be noted that the process 500 is but one way of handling logging in accordance with the present invention and as such should not be construed as limiting the scope of the invention. The process 500 begins at 502 by determining if the http response object has a failure code set. If the failure code is not set, then the http request is logged by calling a log method by the logging module at 504. On the other hand, if the failure code has been set, then the http request is logged by calling a log error method by the logging module at 506. In either case, after the logging methods have complete, the servlet is put into a wait state until the next http request is received at 306.

Figure 6:
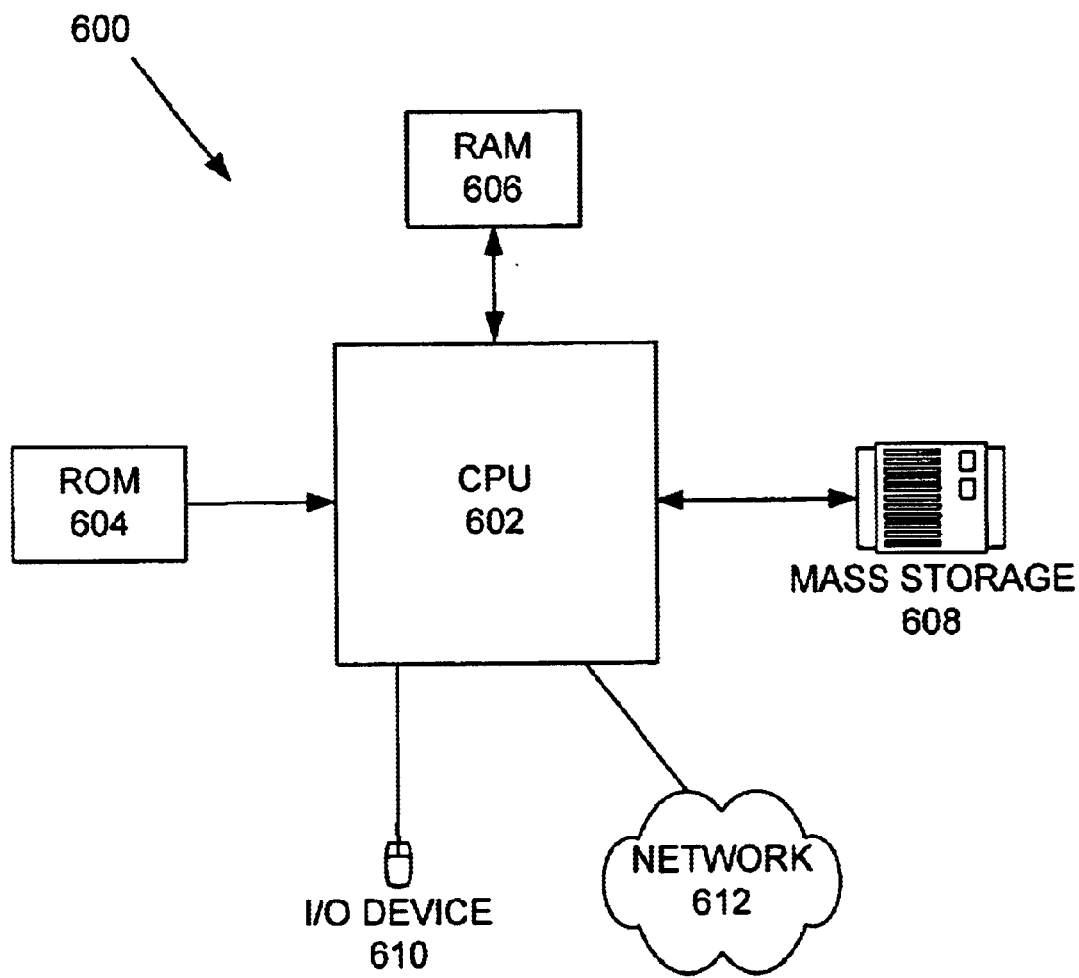
FIG. 6 illustrates a computer system that can be employed to implement the present invention

FIG. 6 illustrates a computer system 600 that can be employed to implement the present invention. The computer system 600 or, more specifically, CPUs 602, may be arranged to support a virtual machine, as will be appreciated by those skilled in the art. As is well known in the art, ROM acts to transfer data and instructions uni-directionally to the CPUs 602, while RAM is used typically to transfer data and instructions in a bi-directional manner. CPUs 602 may generally include any number of processors. Both primary storage devices 604, 606 may include any suitable computer-readable media. A secondary storage medium 608, which is typically a mass memory device, is also coupled bi-directionally to CPUs 602 and provides additional data storage capacity. The mass memory device 608 is a computer-readable medium that may be used to store programs including computer code, data, and the like. Typically, mass memory device 608 is a storage medium such as a hard disk or a tape which generally slower than primary storage devices 604, 606. Mass memory storage device 608 may take the form of a magnetic or paper tape reader or some other well-known device. It will be appreciated that the information retained within the mass memory device 608, may, in appropriate cases, be incorporated in standard fashion as part of RAM 606 as virtual memory. A specific primary storage device 604 such as a CD-ROM may also pass data uni-directionally to the CPUs 602.

CPUs 602 are also coupled to one or more input/output devices 610 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 602 optionally may be coupled to a computer or telecommunications network, e.g., an Internet network or an intranet network, using a network connection as shown generally at 612. With such a network connection, it is contemplated that the CPUs 602 might receive information from the network, or might output information to the network in the course of performing the above-described method steps. Such information, which is often represented as a sequence of instructions to be executed using CPUs 602, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention.

Although the methods of providing custom security and logging protocols in a servlet engine in accordance with the present invention are particularly suitable for implementation with respect to a Java™ based environment, the methods may generally be applied in any suitable object-based environment. In particular, the methods are suitable for use in platform-independent object-based environments. It should be appreciated that the methods may also be implemented in some distributed object-oriented systems.

While the present invention has been described as being used with a computer system that has an associated web browser and web server, it should be appreciated that the present invention may generally be implemented on any suitable object-oriented computer system. Therefore, the present examples are to be considered as illustrative and not restrictive, and the invention is not to be limited to the details given herein, but may be modified within the scope of the appended claims along with their full scope of equivalents.

What is claimed is:

1. A servlet engine arranged to provide a customized security protocol, comprising:
    a servlet container that includes,
        a security module arranged to provide the customized security protocol that includes a selected authentication protocol and/or a selected authorization protocol, wherein when a request received by the servlet engine fails the customized security protocol, the security module generates one of a number and type of user selected error codes corresponding to a failed security protocol;
        a logging module coupled to the security module arranged to record the user selected error codes generated by the security module wherein the number and type of recorded error codes provides a characterization of the security failures; and
        a servlet coupled to the security module and the logging module arranged to handle only those received requests that pass the selected security protocol which are also recorded by the logging module.

2. A servlet engine as recited in claim 1 wherein the servlet engine is included in a server.

3. A servlet engine as recited in claim 2, wherein the server is coupled to a client application capable of generating the request received by the servlet engine.

4. A servlet engine as recited in claim 3, wherein the client application is a web browser and the server is a web server, wherein the request is an http request that identifies a host computer having a data base in which a requested document is stored.

5. A servlet engine as recited in claim 4, wherein the data base is coupled to the servlet engine and wherein the request is a data base access request required to access the data base in order to acquire information stored therein.

6. A servlet engine as recited in claim 5, wherein the servlet responds to the http request by providing an http response to the web browser.

7. A servlet engine as recited in claim 6, wherein the browser includes an applet arranged to generate the http request in response to user supplied input.

8. A servlet engine as recited in claim 7, wherein a cookie is provided to the web browser by the security module when a session is initiated by the web browser, wherein the cookie is used to by subsequent http requests during the session to bypass the security module in order to be handled directly by the servlet.

9. A servlet engine as recited in claim 8, wherein the security module periodically determines if the cookie is a valid cookie.

10. A servlet engine as recited in claim 9, wherein the valid cookie is an unexpired cookie.

11. A servlet engine as recited in claim 10, wherein the web server resides in the host computer and wherein the host computer is part of the Internet network of computers.

12. A method of accessing a protected resource coupled to a servlet, comprising:
    providing a security module arranged to provide a customized security protocol that includes a selected authentication protocol and/or a selected authorization protocol, wherein when a request received by a servlet engine fails a selected security protocol, the security module generates one of a number and type of user selected error codes corresponding to the failed security protocol;

providing a logging module coupled to the security module arranged to record the selected error codes generated by the security module wherein the number and type of recorded error codes provides a characterization of the security failures;

determining by the security module that the received request originates from a verified source based upon the selected authentication protocols, and that the received request has appropriate permission based upon the selected authorization protocols;

recording error codes by the logging module corresponding to those requests that do not originate from the verified source or do not have appropriate permission;

handling by the servlet those received requests that are authenticated and authorized by the security module;

notifying the logging module by the servlet of those requests which have been successfully handled by the servlet with a first type flag; and providing access to the protected resource by the servlet for those requests that are identified by the first type flag.

13. A method as recited in claim 12, wherein the protected resource is a data base.

14. A method as recited in claim 13, wherein the request is a data base access request.

15. A method as recited in claim 14, wherein the servlet engine resides in a host computer coupled to the protected data base.

16. A method as recited in claim 15, wherein the host computer is coupled to a client application, wherein the client application generates the data base access request in the form of an http request.

17. A method as recited in claim 16, wherein the client application is a browser having an applet that responds to a user supplied input by generating the http request.

18. An apparatus for providing access to a protected resource, comprising:

a security protocol providing means for providing a user selected authentication protocol and/or a user selected authorization protocol;

an authentication means for first determining that a source of a protected resource access request is verified based upon the user selected authentication protocol;

an authorization means for second determining that the source of the protected access request has appropriate protected resource access permission based upon the user selected authorization protocol;

a request handling means coupled to the authorization means for servicing those requests passed by both the authentication means and the authorization means; and a logging means coupled to the authentication means and the authorization means for recording failed authentication or failed authentication transactions as well as serviced transactions.

19. A servlet engine as recited in claim 1, wherein the error codes include a "401" error code that indicates an authentication attempt has failed and a "404" error code that indicates that a particular object in not found.

20. A method as recited in claim 12, wherein the error codes include a "401" error code that indicates an authentication attempt has failed and a "404" error code that indicates that a particular object in not found.

* * * * *